United States Patent Office 3,414,544
Patented Dec. 3, 1968

3,414,544
METHOD OF PREPARING COPOLYMERS OF FORMALDEHYDE AND FURFURAL
François Meiller, Palaiseau, France, assignor to Produits Chimiques Pechiney Saint-Gobain, Neuilly-sur-Seine, France
No Drawing. Filed May 4, 1964, Ser. No. 364,810
Claims priority, application France, May 6, 1963, 933,793
19 Claims. (Cl. 260—67)

ABSTRACT OF THE DISCLOSURE

New heat-stable high molecular weight polyoxymethylene copolymers containing from 0.5 to 20% of recurrent oxyfurfurylidene radicals and method of producing them by copolymerization under anhydrous oxygen-free conditions in the presence of an organic anionic catalyst.

---

This invention relates to the copolymerization of formaldehyde and furfuraldehyde, usually called furfural. The invention produces new and superior products by a superior process.

It is known to prepare copolymers of formaldehyde by reacting trioxane with aldehydes in the presence of catalysts but such copolymers have not had good thermal stability as produced, and stabilization to heat has often been difficult. Their molecular weights have tended to be low.

It is an object of the invention to produce copolymers of formaldehyde and furfural which have high molecular weight, which are easy to stabilize thermally, and which will withstand prolonged exposure to moderately high temperature without loss of qualities.

The objects of the invention as to process are accomplished, generally speaking, by a method of preparing copolymers of formaldehyde and furfural which comprises flowing the monomers into contact with each other, and with an anionic catalyst under anhydrous conditions at superatmospheric temperature, and washing the copolymer with an inert liquid. The objects as to product are accomplished by copolymers of formaldehyde and furfuraldehyde of high molecular weight, having a polyoxymethylene structure containing recurrent oxyfurfurylidene radicals.

In practice the copolymerization is carried out under anhydrous conditions in the presence of anionic catalyst, and in the absence of free oxygen.

The present process is carried out under anhydrous conditions in an inert liquid medium or in vapor phase.

In the process the principal monomer is formaldehyde, preferably in the gas phase, which may be obtained by any known process, for instance directly from methanol or by passing it through the intermediate stage of hemiformal, or when small installations are involved by the thermal or catalytic decomposition of alphapolyoxymethylene. The liquid furfural is advantageously distilled under reduced pressure which eliminates all traces of humidity. It is important to operate in a practically anhydrous medium, for instance those which do not contain substantially more than 800 parts/million of water in the monomers, when working in liquid phase. When working in gas phase, it is better to restrict the water to not substantially more than 300 parts/million in the monomers. The amount of furfuraldehyde present in the copolymer may vary from 0.1 to 20%, but proportions from 0.1 to 2% by weight of furfural in the chain are generally sufficient to produce copolymers having physical properties substantially superior to the physical properties of formaldehyde homopolymers. When polymerization in liquid phase is carried out, the introduction of the monomers may take place in several convenient ways, for instance by introduction of gaseous anhydrous formaldehyde monomer into a reactor containing an anhydrous solvent in which the furfural and catalyst have been dissolved, or by introducing furfural and formaldehyde at the same time, for instance continuously, or by any other means which permits the simultaneous introduction of two monomers into contact with and preferably into the solvent which contains the catalyst. As solvents for the reaction medium, any chemically inert liquid can be employed which does not react with the monomers or the catalyst and in which the monomers are soluble and the copolymers are insoluble. Hydrocarbon solvents are especially useful, can be used alone or in mixtures, and may favorably be present in about three times the weight of the monomers. Among the solvents in which the monomers are soluble and the polymers are insoluble are, for example, aliphatic hydrocarbons, cycloaliphatic hydrocarbons, aromatic hydrocarbons, or their derivatives, among which one may cite hexane, heptane, cyclohexane, light gasoline fractions, benzene, toluene and nitrobenzene. All of these solvents may be used alone or in mixtures.

When operations are carried out in vapor phase, it is highly satisfactory to form a bed of granules of the copolymer in a reaction vessel, bringing the reactants into contact with the bed and with each other, the catalyst being either included in one or both of the gaseous monomers or included in the bed. Other beds can be used, for instance polyformaldehyde powder, but such use produces a mixture of polymers and will not be employed when a mixture is undesirable. Good results are obtained by passing the gaseous formaldehyde through the space above a bath of furfural heated to a temperature between room temperature and 160° C. The formaldehyde entrains the furfural vapors and the copolymerization takes place when they enter the reactor and make contact with the catalyst. In controlling the temperature of the furfural and the rate of flow of formaldehyde, one may change the relationship of formaldehyde to furfural in the gaseous mixture.

The furfural may also be carried into the reaction chamber on a current of inert gas such as nitrogen. If desired, the formaldehyde may be introduced through another opening.

It will be understood that in order to keep the system anhydrous, the process will be carried out in closed vessels linked by appropriate conduits, the reaction vessel being provided with means to remove the copolymer after its formation and tight joints being provided to exclude the humidity of the atmosphere.

In the case of polymerization in liquid phase as well as in vapor phase, the quantity of monomeric formaldehyde which flows into the reaction chamber is regulated as desired, for example by controlling the speed of pyrolysis of alphapolyoxymethylene, and the speed of pyrolysis is in turn controlled by regulating the quantity of heat which is applied to it.

The process of the present invention is applicable satisfactorily at atmospheric pressure but it is possible to operate at reduced pressure or at pressure which is slightly superior to atmospheric. Such conditions of operation, when they differ from atmospheric pressure, may easily be determined as a function of the vapor tensions of the reactants and solvents at the temperatures employed.

It is usually preferred to carry out the copolymerization in liquid phase or in gas phase, in a reaction medium from which oxygen or gases containing it have been removed. The reaction space may advantageously receive a flow of inert gas, such as nitrogen.

When operating in liquid phase, the temperature employed may be between −100° and +120° C., more advantageously between −80° and +70° C., and preferably between −15° and +50° C. When operating in vapor phase the temperatures may be between −90° and +120° C., more advantageously between −20° and +100° C., and preferably between room temperature and 80° C.

The catalysts are anionic. Among the anionic catalysts which may be employed are the tertiary amines, the phosphines, the arsines, the stibines, and those of which the molecules contain an atom of phosphorous in tri or penta valent state associated with one or more radicals containing nitrogen, or those containing one or more atoms of silicon associated with one or more groups containing nitrogen, or with those containing an atom of tri-valent nitrogen in one or a plurality of rings. Among the specific catalysts which have given satisfaction are trimethylamine, triethylamine, tributylamine, dimethylcyclohexylamine, benzyldimethylamine, N,N-dimethylpiperazine, triethylphosphine, trimethylphosphine, tributylphosphine, triphenylphosphine, ethyldiphenylphosphine, triphenylarsine, alpha picoline, gamma picoline, hexamethylaminodisilane, and triphenylstibine.

When operating in liquid phase the catalyst employed may vary, generally speaking, between about 0.01 and 2.5 moles per thousand moles of a mixture of monomers and when operating in gas phase the quantity employed may be between about 0.005 and 0.5 mole per thousand moles of mixed monomers. In liquid phase operation, the catalyst may be dissolved or may be suspended in the solvent if it is not completely soluble. When operating in gas phase the catalyst may be introduced as a gas or vapor or, when it is a solid, it may be mixed with the bed of polymer powder in the bottom of the reaction chamber. When the catalyst can be vaporized or atomized, it can be sprayed into the reaction chamber, or preferably, swept into the chamber by a current of inert gas such as nitrogen. It is also possible to use the current of mixed gaseous monomers, or one of them, to entrain appropriate quantities of vaporized catalyst.

At the end of the operation the catalyst is removed in any satisfactory way, for instance considering its vapor tension by agitation with air or by washing by means of an appropriate solvent. Furthermore it can be removed during the course of the molecular stabilization of the ends of the copolymer chains, which is carried out by etherification or esterification of the chain ends. This is a known process which has been employed before, usually by acetylation. The copolymers obtained by the process of the invention have high molecular weight, for instance on the order of 60 M to 80 M, they are readily stabilized by the standard methods, and yield products of high quality, in particular, films made from them will resist prolonged heating in an oven at 110° C., in air, without modification of their mechanical properties, and this quality is maintained even when they have been mixed with pigments, antioxidants, fillers, plasticizers and stabilizers.

The following examples illustrate the invention:

Example 1

A 3 l. flask provided with four apertures, of which two serve for the inflow and outflow of gas and the third and fourth to mount an agitator and a thermometer, respectively, received 1,000 cc. of hexane in which 15 g. of furfural and 0.3 g. of a mixture of alpha and gamma picoline catalyst had been dissolved. The temperature of the flask was maintained at 25° C. throughout the process. The flask was scavenged by a flow of nitrogen, and anhydrous monomeric formaldehyde was flowed into it at a rate of 40 g./hr. The monomer was bubbled through the solution. The reaction began immediately. After 5 hours the flow of formaldehyde was stopped and the solids were removed from the flask and from the residual liquids. 195 g. of the copolymer were obtained which were washed with acetone and dried; they were insoluble at 20° C. in an aqueous molar solution of sodium sulfite. The copolymer was stabilized by acetylation using an ordinary technique as applied to formaldehyde polymers in the prior art. The product contained 1.3% of furfural as determined by chemical analysis and by spectrography. The product had a constant for the speed of thermal degradation at 222° C. ($k_{222}$) of 0.15% per minute, which is the percentage of loss of weight per minute based on the weight of the residual copolymer.

The stabilized copolymer was pressed at 180° C. and 50 kg./cm.$^2$ into a thin film, the thickness of which was a function of the temperature and pressure. This film was subjected to standard bending tests and withstood very numerous bendings. After being heated in an oven for 7 days at 110° C., in air, a film made in the same way from the same product had substantially identical properties of mechanical resistance.

Example 2

Operating as in Example 1 but replacing the catalyst by 0.1 g. of triethylamine, there was produced a copolymer insoluble at 20° C. in an aqueous molar solution of sodium sulfite. After acetylation it was determined that it contained 0.5% of furfural radicals.

Example 3

Proceeding as in Example 1 but with 0.2 g. of hexamethylaminodisilane in place of the picoline catalyst, there was produced a copolymer which was insoluble under the same conditions and which, after acetylation and pressing at 180° C. at 50 kg./cm.$^2$, produced a film which satisfactorily resisted numerous bendings by standard tests. Spectrographic analysis showed that the copolymer contained 1.5% of furfural.

Example 4

A metallic reaction vessel having a horizontal cylinder with an internal rotary agitator of blade type received a flow of 200 g. of unstabilized copolymer produced by Example 1. Monomeric formaldehyde flowed into the reactor at 50 g./hr. after having passed through the upper part of a vessel containing furfural at 80° C., thereby entraining furfural vapors at a constant rate. There was also delivered to the reactor in a slow current of dry nitrogen 10 mg./hr. of alpha picoline catalyst. The reaction began immediately and after 8 hours of operation under the same conditions the temperature of the mass was 50° C. and the flow of reactants was arrested. The copolymer was a powder which was washed with acetone. The yield as substantially quantitative and was about 400 g. The copolymer was stabilized by acetylation and spectrographic analysis showed 0.95% of furfural. The product was insoluble by the test of Example 1 and had $k_{222}$ of 0.12% per minute. When pressed at 180° C. at 50 kg./cm.$^2$ the resulting film withstood a very high number of bendings by standard tests. A like film heated for 7 days at 110° C. showed no loss of mechanical resistance.

The advantages of the invention are in the production of copolymers of formaldehyde and furfural in which the furfural is present in a minor percent, occurs as recurrent radicals in the chain, and yields a product substantially superior to homopolyformaldehyde. The process of manufacture is simple and effective and can be carried out either in liquid or gas phase. Experience has shown that it is unnecessary to include large percentages of furfural to obtain a substantial improvement in the qualities of the polymer.

As many apparently widely different embodiments of the present invention may be made without departing from the spirit and scope thereof, it is to be understood that the invention is not limited to the specific embodiments.

What is claimed is:

1. A method of preparing copolymers of formaldehyde and furfural which comprises intermixing formaldehyde, furfural, and a catalytic amount of an organic anionic catalyst under anhydrous conditions in the absence of free oxygen, and isolating the copolymer.

2. The method of claim 1 in which the catalyst is a tertiary amine.

3. The method of claim 1 in which the catalyst is a phosphine.

4. The method of claim 1 in which the catalyst is an arsine.

5. The method of claim 1 in which the catalyst is a stibine.

6. The method of claim 1 in which the catalyst is a compound having an atom of tri- or penta-valent phosphorous, associated with one or more radicals containing nitrogen, in its molecule.

7. The method of claim 1 in which the catalyst has one or more atoms of silicon, associated with one or more radicals containing nitrogen, in its molecule.

8. The method of claim 1 in which the catalyst is a cyclic compound containing nitrogen in the ring.

9. The process of claim 7 in which the temperature of operation is between $-100°$ and $+120°$ C.

10. The process of claim 1 in which the catalyst is selected from the group consisting of trimethyl amine, triethyl amine, tributyl amine, dimethylcyclohexylamine, benzyldimethyl amine, N,N,-dimethylpiperazine, triethylphosphine, trimethylphosphine, tributylphosphine, triphenylphosphine, ethyldiphenylphosphine, triphenylarsine, triphenylstibine, alpha picoline, gamma picoline, and hexamethylaminodisilane.

11. A method of preparing copolymers of formaldehyde and furfural which comprises, under anhydrous conditions and in the absence of reactive oxygen, dissolving furfural and a catalytic amount of an organic anionic catalyst in a hydrogen solvent which does not dissolve the copolymer, flowing formaldehyde into the solution at about room temperature, and separating the copolymer from the solution.

12. A method of preparing copolymers of formaldehyde and furfural which comprises forming a bed of unstabilized formaldehyde-furfural copolymer in an oxygen free reaction space, flowing the monomers into contact with each other, the bed, and an organic anionic catalyst under anhydrous conditions at superatmospheric temperature, and washing the copolymer with an inert liquid.

13. The process of preparing copolymers of formaldehyde and furfural which comprises, under anhydrous conditions and in the absence of reactive oxygen, dissolving furfural and a catalytic amount of an anionic catalyst in a hydrocarbon solvent, which does not dissolve the copolymer, flowing formaldehyde into the solution at about room temperature, and separating the copolymer from solution in which the solvent is at least three times the weight of the monomers.

14. The process of preparing copolymers of formalhyde and furfural which comprises intermixing formaldehyde, furfural, and a catalytic amount of an anionic catalyst under anhydrous conditions in the absence of free oxygen, and isolating the copolymer in which the catalyst is between 0.005 and 2.5 moles per 1000 of the weight of the monomers.

15. A method of preparing copolymers of formaldehyde and furfural, which comprises intermixing formaldehyde, furfural, and a catalytic amount of an anionic catalyst selected from the group consisting of tertiary amines, tertiary phosphines, tertiary arsines, tertiary stibines, trivalent and pentavalent phosphorous compounds having radicals containing nitrogen, silicon compounds having radicals containing nitrogen, and cyclic compounds containing nitrogen in the ring, under anhydrous conditions in the absence of free oxygen and isolating the copolymer.

16. A method of producing copolymers of formaldehyde and furfural, which comprises mixing a fluid stream of monomeric formaldehyde with monomeric furfural and 0.005 to 2.5 moles per 1,000 of the weight of monomers of an organic anionic catalyst to produce a copolymer having a predominantly polyoxymethylene structure with 0.1 to 20% of recurrent oxyfurfurylidene groups.

17. A method of preparing copolymers of formaldehyde and furfural which comprises forming a bed of particles of unstabilized formaldehyde furfural copolymer, flowing the monomers of formaldehyde and furfural into contact with each other and with the bed and with a catalytic amount of an organic anionic catalyst under anhydrous oxygen-free conditions and removing the copolymer from the monomer and the catalyst, in which the catalyst is selected from the group consisting of tertiary amines, tertiary phosphines, tertiary arsines, tertiary stibines, trivalent and pentavalent phosphorous compounds having radicals containing nitrogen, silicon compounds having radicals containing nitrogen, and cyclic compounds containing nitrogen in the ring.

18. A method of preparing copolymers of formaldehyde and furfural which comprises forming a bed of unstabilized formaldehyde-furfural copolymer in an oxygen-free reaction space, flowing the monomers into contact with each other, the bed, and an organic anionic catalyst in amount between 0.005 and 0.5 mole per 1,000 moles of monomer under anhydrous conditions, and separating the polymers.

19. A method of preparing copolymers of formaldehyde and furfural which comprises, under anhydrous conditions and in the absence of reactive oxygen, dissolving furfural and a catalytic amount, between 0.01 and 2.5 moles per 1,000 moles of the monomers, of an anionic catalyst in a hydrocarbon solvent which does not dissolve the copolymer, flowing formaldehyde into the solution at about room temperature, and separating the copolymer from the solution.

References Cited
UNITED STATES PATENTS

| | | | |
|---|---|---|---|
| 1,873,599 | 8/1932 | Kappeler | 260—67 |
| 3,272,780 | 9/1966 | Wilson et al. | 260—73 |

OTHER REFERENCES

Walker: Formaldehyde (Reinhold, N.Y.), 3rd edition, ACS Monograph Series No. 159, 1964, pp. 180–184, QD 305 A6 W3.

WILLIAM H. SHORT, *Primary Examiner.*

L. M. PHYNES, *Assistant Examiner.*